United States Patent [19]

Uken et al.

[11] Patent Number: 5,475,779
[45] Date of Patent: Dec. 12, 1995

[54] COUPLERS FOR TERMINATING OPTICAL FIBER ENDS

[75] Inventors: William D. Uken, Fremont; Akira Tomita, Redwood City, both of Calif.

[73] Assignee: Raychem Corporation, Menlo Park, Calif.

[21] Appl. No.: 374,390

[22] Filed: Jan. 17, 1995

Related U.S. Application Data

[63] Continuation of Ser. No. 60,123, May 11, 1993, abandoned, which is a continuation of Ser. No. 518,050, May 4, 1990, Pat. No. 5,253,935.

[51] Int. Cl.⁶ .............................. G02B 6/26; G02B 6/42
[52] U.S. Cl. ................................... 385/32; 385/49
[58] Field of Search .......................... 385/32, 49

[56] References Cited

U.S. PATENT DOCUMENTS

| | | | |
|---|---|---|---|
| 3,045,223 | 7/1962 | Kapany | 340/234 |
| 3,244,075 | 4/1966 | Richards et al. | 58/106 |
| 3,412,255 | 11/1968 | Krieger | 250/227 |
| 3,449,036 | 6/1969 | Jacobsen | 350/96 |
| 4,253,727 | 3/1981 | Jeunhomme et al. | 350/96.15 |
| 4,479,701 | 10/1984 | Newton et al. | 350/96.16 |
| 4,586,783 | 5/1986 | Campbell et al. | 350/96.15 |
| 4,728,169 | 3/1988 | Campbell et al. | 350/96.15 |
| 4,741,585 | 5/1988 | Uken | 350/96.15 |
| 4,759,605 | 7/1988 | Shen et al. | 350/96.15 |
| 4,792,202 | 12/1988 | Zucker et al. | 350/96.16 |
| 4,822,125 | 4/1989 | Beals et al. | 350/96.15 |
| 4,824,199 | 4/1989 | Uken | 350/96.15 |
| 4,834,482 | 5/1989 | Campbell et al. | 350/90.15 |
| 4,871,222 | 10/1989 | Burghardt et al. | 350/96.14 |
| 4,878,726 | 11/1989 | Fatehi | 350/96.16 |
| 5,253,935 | 10/1993 | Uken et al. | 350/96.16 |

FOREIGN PATENT DOCUMENTS

| | | | |
|---|---|---|---|
| 0094096 | 11/1983 | European Pat. Off. . | |
| 0094096A1 | 11/1983 | European Pat. Off. | H04B 9/00 |
| 0253564 | 1/1988 | European Pat. Off. . | |
| 0253564A1 | 1/1988 | European Pat. Off. | H04L 5/14 |
| 2509479 | 1/1983 | France | G02B 5/14 |
| 3721822 | 11/1988 | Germany . | |
| 9100176 | 3/1992 | Netherlands . | |
| 8700996 | 2/1987 | WIPO . | |
| WO87/00996 | 2/1987 | WIPO | H04B 9/00 |

OTHER PUBLICATIONS

Patent abstract of Japan Vo. 13, No. 583(P–981) [3931] 22 Dec. 1989 and JP, A 1–246512 (Nippon Telegraph) 2 Oct. 1989.

*Primary Examiner*—Rodney B. Bovernick
*Assistant Examiner*—Robert E. Wise
*Attorney, Agent, or Firm*—Herbert G. Burkard; A. Stephen Zavell

[57] ABSTRACT

An optical fiber transmission network for transmitting voice, data, or video signals between telecommunication units includes optical couplers which bend an optical fiber at a location in close proximity to the fiber end so as to allow coupling with the fiber through its side rather than through the end of the fiber. This eliminates the need for cleaving and polishing the fiber end, and results in a craft friendly way of terminating an optical fiber end with a telecommunication unit.

20 Claims, 6 Drawing Sheets

FIG_1

FIG_1B

FIG_1A

FIG_1C

FIG_2

FIG_3

FIG_4

FIG_5

FIG_6

FIG_7

FIG_8

COUPLERS FOR TERMINATING OPTICAL FIBER ENDS

RELATED APPLICATIONS

This application is a File Wrapper Continuation application of Ser. No. 08/060,123 filed May 11, 1993, and now abandoned, which is a continuation of U.S. Ser. No. 07/518,050 filed May 4, 1990, now U.S. Pat. No. 5,253,935.

FIELD OF THE INVENTION

The present invention relates to means and methods for conveniently coupling light between electro-optic transducers and optical fibers for communicating encoded data, voice, or video information between telecommunication units.

BACKGROUND OF THE INVENTION

Optical fiber is increasingly being utilized for transmitting data, voice, and video information between telecommunication units such as computers, telephones, CATV head ends, televisions, etc. In particular, in systems having point-to-point connections whereby large amounts of information are to be transferred, optical fiber is widely favored over electrical communications media in view of the far larger bandwidth available for optical fiber and its immunity to electromagnetic interference. However, in distribution networks where individual telecommunication units are to be interconnected, optical fiber is not as widely favored since oftentimes the bandwidth necessary for transmitting the desired information between the telecommunication units is not extraordinarily large, and since it has proven difficult to conveniently couple light between electrooptic transducers and optical fiber. This latter disadvantage is most prevalent in local area networks, public switch telephone networks, and video distribution networks, e.g. CATV.

SUMMARY OF THE INVENTION

It is an object of the present invention to provide methods and means for more conveniently coupling encoded light signals, preferably encoded data, voice, or video information, from an optical fiber core and an electro-optic transducer so as to result in a extremely field friendly installation and hence craft friendly system.

As used herein, encoded data, voice, and/or video information refers to digital information or AM or FM analog information, encoded at a modulation rate in excess of a minimum rate associated with transmission of encoded signals by telecommunication units, in the case of data or voice the modulation rate should exceed 4 kHz analog and 32 kHz digital and in the case of video the modulation rate should exceed 3 mHz analog and 10 mHz digital for high quality video, e.g. CATV. Preferably the encoded modulation rate overall exceeds 0.25 mHz, preferably 1.0 mHz, more preferably 2.0 mHz, particularly 5.0 mHz, more particularly 10.0 mHz, optimally 20.0 mHz, especially in excess of 40 mHz, 60 mHz, or 100 mHz.

These and other objects of the invention are achieved by the provision of various optical couplers capable of coupling light signals between a core of an optical fiber and an electro-optic transducer by passing light through a side of the fiber. Particularly advantageous implementations of the invention are for coupling the light through the side of the fiber at a location in close proximity to an end of the fiber. Close proximity as used herein means less than 20 cm, optimally less than 10 cm, preferably less than 5 cm, most optimally less than 3 cm, and most preferably less than 1 cm.

Accordingly, signals can be coupled without requiring that the optical fiber end be carefully terminated as is required in the prior art, careful termination generally requiring that the optical fiber end be precisely cleaved, polished, and then coupled within a connector. These processes are generally very craft sensitive to implement, and hence optical fiber networks requiring these processes are unduly expensive to install and repair.

Preferred couplers for implementing the invention include one whereby first and second optical fibers are bent in first and second planes which are offset, adjacent, and parallel to one another, with electro-optic transducers being used for coupling light with the fibers so bent being oriented so that light emitting or receiving areas thereof have their light emitting and receiving axes extending along a direction substantially perpendicular to the planes defined by the first and second bent fibers. This arrangement results in a extremely compact structure which is usefully deployed in areas where space is at a premium, such as on the face of closely stacked printed circuit boards.

A further preferred implementation of the invention is the provision of an optical coupler which has a first substrate having a curved plane thereon with first and second fiber frictional engagement areas at opposite ends of the plane for securely holding first and second fibers on the curved plane, the coupler including a second substrate having a second curved plane complementary in shape to the first curved plane so that when the first and second substrates are registered with their curved planes mating at least one or more optical fibers are accurately positioned and held in place between the first and second substrates so that coupling with the fibers can easily occur. A preferred use of this design would be a connector which emulates a telephone jack for residences or businesses whereby the second substrate would be more or less permanently installed in a structure, e.g. a wall, and the first substrate would be available for connecting to fibers in a cable of a network. An alternate implementation of this embodiment would be the provision of a printed circuit board or a high density interconnect substrate which has a plurality of the second substrates embedded therewithin or simply a plurality of second curved planes formed therewithin, with the first substrate being mateable with the curved planes so as to be connectable and disconnectable to any one thereof so as to result in a easy connect-disconnect cross connect apparatus.

More specifically, the invention includes an optical fiber transmission network for transmitting at least one of data, voice, and video signals between first and second telecommunication units, comprising:

first and second telecommunications units;

a first optical fiber having first and second ends for transmitting at least one of data, voice, and video signals between the units;

means for modulating light from a light source so as to represent information indicative of the data, voice, or video signals to be transmitted from the first telecommunication unit to the second telecommunication unit;

means for injecting the modulated light into the first optical fiber so as to propagate away from its first end and towards its second end;

means for withdrawing and detecting the modulated light through a side of the fiber at a first bend at a location in close proximity to the second fiber end; and means for recreating the data, voice, or video signals from the detected modulated light for use by the second telecommunications unit.

In addition the invention includes an optical fiber transmission network for transmitting at least one of data, voice, and video signals between first and second telecommunication units, comprising:

first and second telecommunication units;

a first optical fiber having first and second ends for transmitting at least one of data, voice, and video signals between the units;

means for modulating light from a light source so as to represent information indicative of the data, voice, or video signals to be transmitted from the first telecommunication unit to the second telecommunication unit;

means for injecting the modulated light into the first optical fiber through a side of the fiber at a first bend at a location in close proximity to the first fiber end so as to propagate towards the second fiber end;

means for withdrawing and detecting the modulated light at a location in close proximity to the second fiber end; and means for recreating the data, voice, or video information from the detected modulated light for use by the second telecommunication unit.

Yet a further feature of the invention is the provision of a two-way telecommunications system utilizing a high speed path in one direction via end couplers and a low speed path in the opposite direction via side couplers.

These and other objects of the invention will be further appreciated by reference to the following detailed description.

DESCRIPTION OF THE PREFERRED EMBODIMENTS

Figure 1:
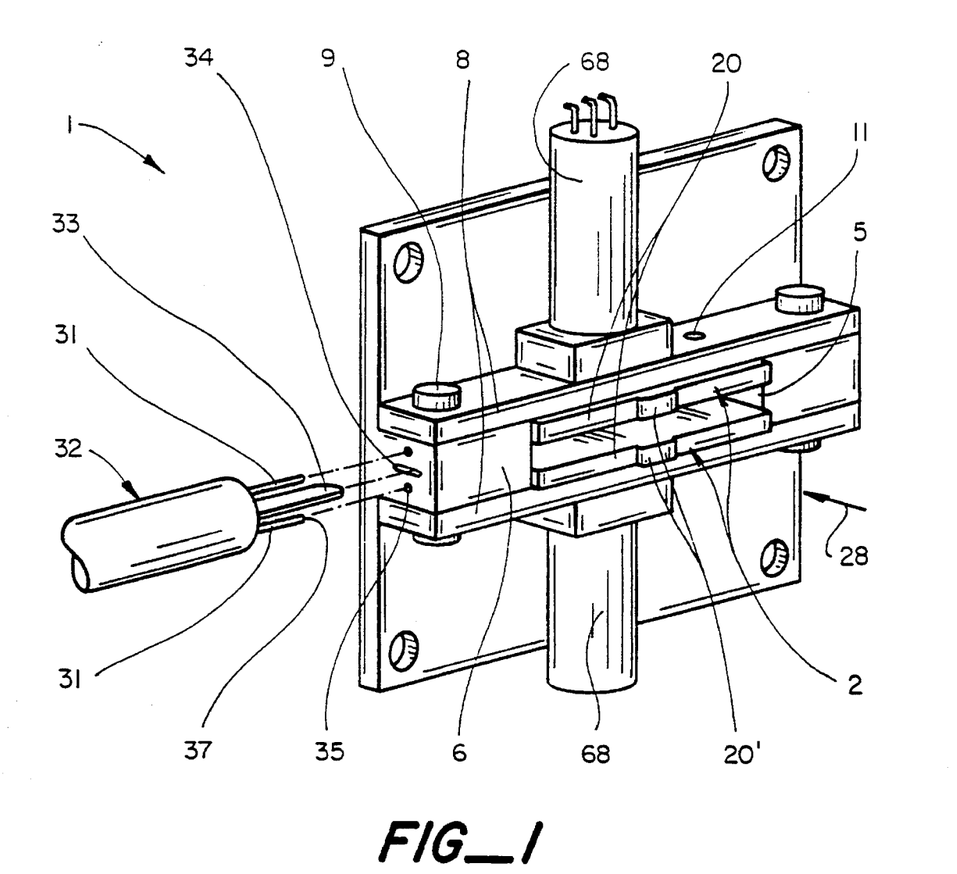
FIG. 1 illustrates a preferred coupler package according to the invention.
Figure 1A:
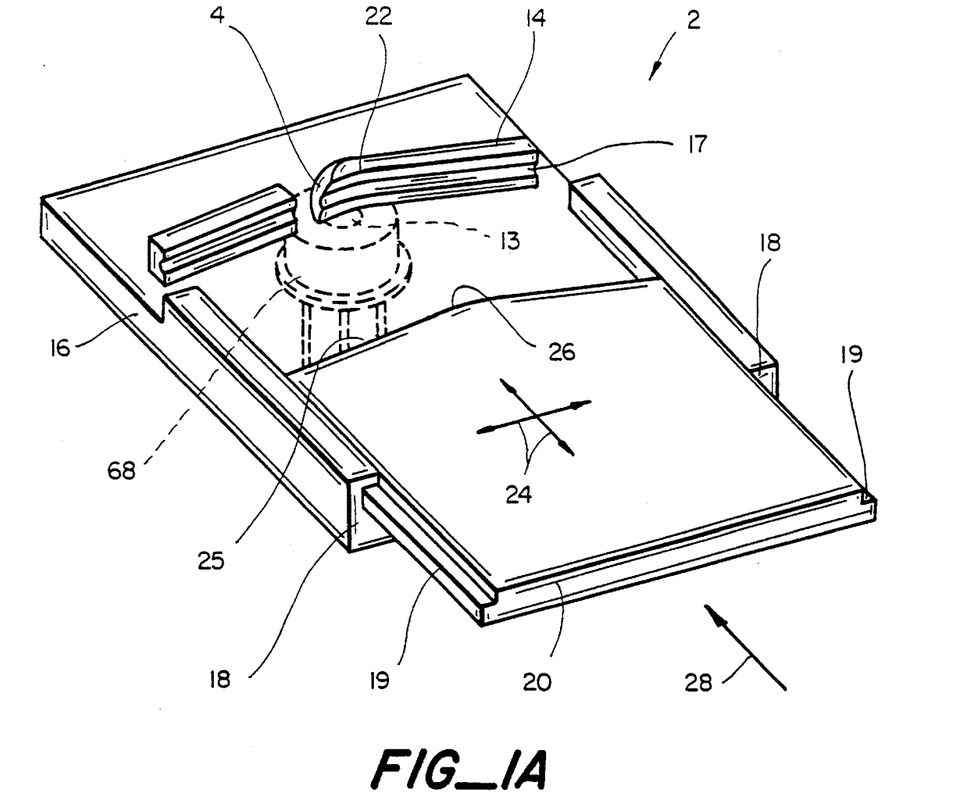
FIG. 1A illustrates a preferred coupler for being packaged in the package illustrated in FIG. 1.
Figure 1B:
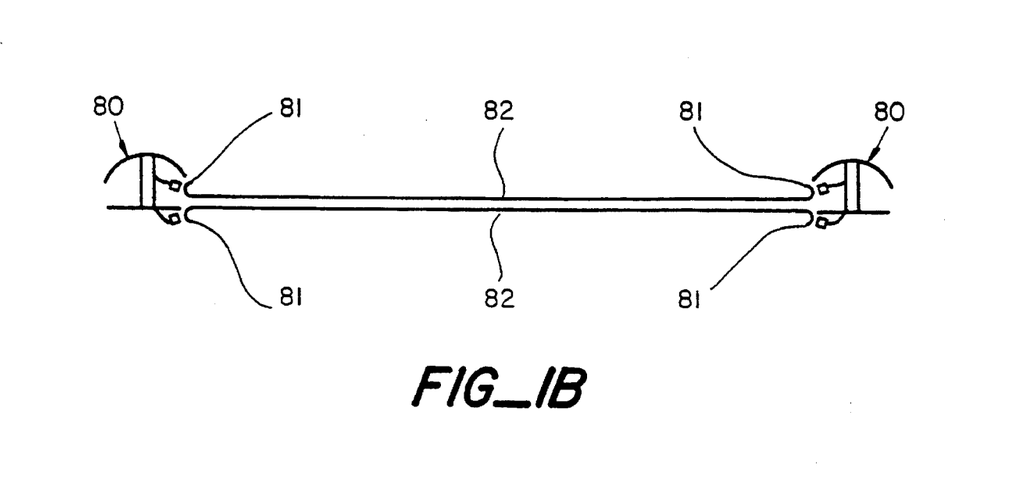
FIGS. 1B and 1C illustrate preferred architectural arrangements for using a package as illustrated in FIG. 1.

FIG. 1B illustrates a first embodiment of the invention, this figure illustrating first and second telecommunication units 80, telephones being illustrated. As previously indicated, the telecommunication units can comprise televisions, CATV head end distribution points, computers, printers, other type of business peripheral telecommunication units which transmit or receive data, voice, etc. The telecommunication units can be hooked up in a point-to-point arrangement, alternatively can be hooked up in a ring architectural arrangement comprising a plurality of point-to-point connections, and alternatively can comprise a bus architecture whereby a plurality of the units 80 are connected to first and second optical fibers which are shared by all the units. In any case, a need exists for conveniently connecting optical fibers with the telecommunication units or extensions thereof (e.g. copper wire) so as not to require that each and every connection point for the optical fiber requires its end to be carefully prepared, which conventionally requires that the end be carefully cleaved, carefully polished, and carefully connected to a connector.

According to one embodiment of the invention, all connections are made in close proximity to an end 81 of the optical fibers 82 but not actually at the ends 81. According to preferred embodiments, the connection is made at a bend in close proximity to the fiber end, and coupling with a core of an optical fiber is achieved by bending the fiber about a sector angle and bend radius sufficient to allow coupling to occur, e.g. injecting light into the core or withdrawing light from the core, the light also interacting either immediately or eventually with an electro-optic transducer. In other words, the light is either generated by a light is emitting device, such as a laser or LED and directly coupled into a core of the optical fiber at its end, or alternatively coupled through the bend by passing the light through a side of its cladding and preferably through its buffer, or alternatively the light propagating in the optical fiber is withdrawn from the core of the fiber by passing the light through a side thereof and is detected by an electro-optic transducer such as a photodetector. Details of preferred bend radii and sector angle as well as actual devices for so coupling light between electro-optic transducers and optical fiber cores are disclosed in U.S. Pat. No. 4,741,585, the s disclosure of which is incorporated herein by reference, a particular device (coupler) disclosed therein being illustrated in FIG. 1A.

Referring to FIG. 1A, the coupler 2 is constructed so as to allow an optical signal to be coupled between an electro-optic transducer and a core of an optical fiber bent by the coupler. More specifically, the coupler includes a base 16 having first and second channels 18 which mate with rails 19 contained on slider 20. The slider 20 is moveable along a direction of arrow 28 within the plane 24 of the fiber bend and along a direction opposite to that of the arrow 28. The base 16 includes a fiber guide 14 having an optical fiber channel 17 therein, the channel 17 having a bend region 22. When an optical fiber is disposed within the channel 17 and the slider is urged along a direction of arrow 28 until slider face 25 contacts the fiber and urges it into the rail, a slider fiber optic bend profile 26 on the face 25 mates with the bend region 22 and keeps a portion of the optical fiber bent about a bend radius and sector angle sufficient to allow light coupling between a core of the optical fiber and the electro-optic transducer 68. More specifically, light traveling along a direction substantially perpendicular to the plane of the arrows 24 is deflectable off mirror surface 4 to or from a core of the optical fiber and from or towards the transducer 68. In FIG. 1A reference numeral 13 illustrates an active area of the transducer 68.

Figure 1C:
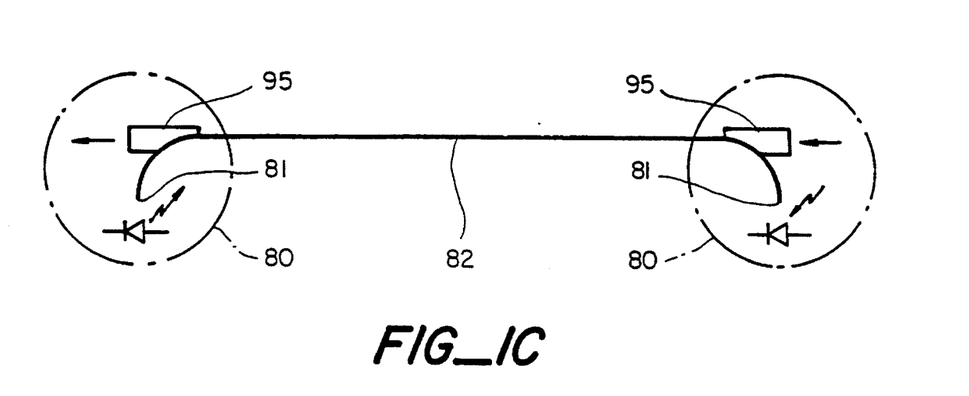

FIG. 1C illustrates an alternate preferred architecture. According to this architecture, signals are sent between first and second telecommunication units 80 bidirectionally, with one direction having light coupled through ends 81 of the optical fiber 82, with the other direction communication path being coupled into the fiber 82 through its side, as illustrated. Preferred side couplers are disclosed in U.S. Pat. No.

4,741,585 referred to above. Preferably each side coupler couples a signal between an electro-optic transducer and a fiber core by passing the signal through a bent side of the fiber cladding, and preferably the buffer. This embodiment is particularly preferred since high speed data, voice, or video information can be sent between the units 80 by coupling to the fiber ends 81 since relatively high coupling efficiencies are thus obtainable. On the other hand, the communication path in the opposite direction which is conveniently implemented using couplers which couple signals into the fiber via bend by passing the signal through a side of the fiber can be used for transmitting lower speed information such as data, voice signals used for provisioning, error checking, monitoring, etc. purposes. As is well known, side couplers 95 are less efficient in injecting signals into an optical fiber and withdrawing signals from an optical fiber than end couplers, though this reduced efficiency is not a problem since this communication path is optimally used for a low speed transmission line with the lower speed allowing the use of a lower strength signal overall. According to a preferred embodiment, the low speed signal coupled via the couplers 95 has a bandwidth in excess of 100 Hz, preferably in excess of 1 kHz, optimally in excess of 10 kHz, and preferably the signal has a modulation rate less than 1 mHz. On the other hand, optimally the high speed transmission line coupled through the fiber ends 81 has a modulation rate in excess of 50 kHz, preferably in excess of 100 kHz, optimally in excess 0.5 mHz, more optimally in excess of 1 or 2 mHz.

Figure 2:
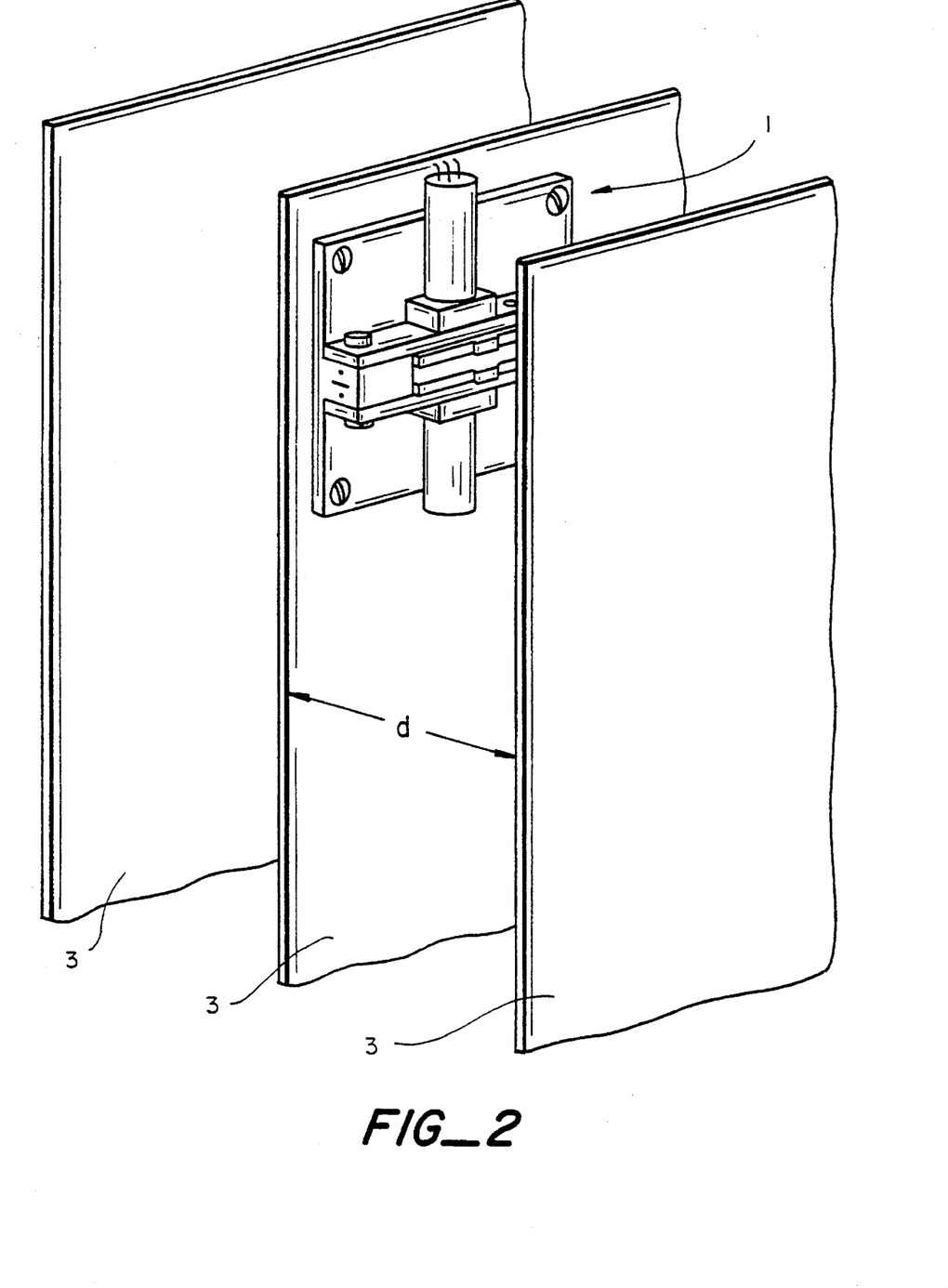
FIG. 2 illustrates a preferred use of the package of FIG. 1 in a printed circuit board arrangement.

FIG. 1 illustrates a preferred package for the couplers of FIG. 1A. Illustrated in FIG. 1 is an optical fiber coupler package 1 which includes first and second optical couplers 2 arranged in a stack arrangement, with a plane 24 (see FIG. 1A) of each coupler extending substantially perpendicular to an axis of an electrooptic transducer 68 associated with each coupler 2. Each transducer axis defines a direction of light emittance from, in the case of a light emitter, or a primary direction of light capture, in the case of a light detector, for the transducer 68. A preferred use of the coupler package 1 is for use on a printed circuit board as illustrated in FIG. 2. A compact structure of the package 1 allows it to be mounted on a printed circuit board and electrically or optically connected thereto in an environment where a plurality of boards 3 are separated by a distance d which is relatively small, e.g. 1 or 2 cm. As is evident by examining FIG. 2, since the electro-optic transducers 68 extend perpendicular to the plane 24 of the couplers 2 and parallel to a plane of the boards 3, a length of the transducers 68 does not restrict the length of the spacing d so that the package 1 can be utilized in a tightly packed printed circuit board environment.

According to the package of FIG. 1, the optical couplers 2 are housed within a cavity 5 in a body 6. Disposed on opposite sides of the body 6 are first and second members 8 secured to the body 6 with appropriate securing means 9. Each member 8 has a portion throughout its thickness adjacent to the coupler mirror 4 which is substantially transparent to light radiation to be coupled with the optical fiber, and each transducer 68 is secured to the package in a vicinity of this transparent area adjacent the mirror 4. The slider 20, modified so as to include protrusion 20', is moveable along the direction of arrow 28 by turning a screw member which activates a cam mechanism, the cam mechanism being more fully described in U.S. application Ser. No. 347,356, the disclosure of which is incorporated herein by reference. Access to the screw turning mechanism can be via hole 11 in each member 8 in the package 1 as illustrated in FIG. 1.

According to the invention, with the slider 20 in a retracted position such that the slider face 25 is separated from the fiber optic channel 17, first and second optical fibers 31 can be loaded into its respective coupler channel 17 by utilizing a tool 32 having a guiding extension 33 which mates with and is guided by slot 34 which extends horizontally through the body 6. Similarly, each fiber 31 is likewise guided into a respective longitudinal hole 35 and the body 6 which extends all the way to the coupler fiber optic channel 17. Accordingly, by pushing the tool 32 an appropriate amount from left to right in FIG. 1, each fiber 31 can be loosely disposed all the way through its respective channel 17 and its respective coupler 2, and each fiber can then be optically coupled and secured within its coupler by turning the screw mechanism by insertion of a tool (not shown) within each hole 11 which extends from each member 8 all the way to each coupler 2. According to an alternate embodiment, instead of optically securing each fiber within each coupler 2 by activating the screw mechanism via the hole 11, as described, according to another preferred embodiment the sliders 20 could simply be pushed in manually or with a suitable tool along the direction of the arrow 28 and held there by a suitable resilient clamp.

These embodiments of the invention are particularly useful where it is desirable to optically couple to a core of an optical fiber through a side thereof near an end 37 of the fiber. This is advantageous since coupling with the fiber end 37 generally requires careful and meticulous preparation of the fiber end 37, e.g. cleaving and polishing.

Figure 5:
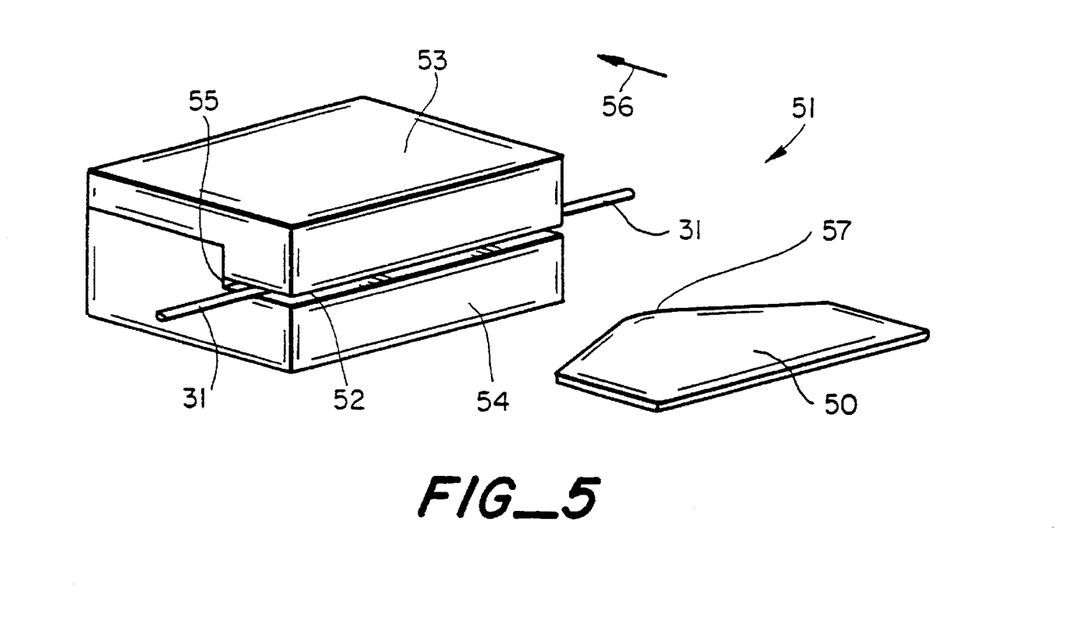
FIG. 5 illustrates yet a further coupler package design for coupling with an optical fiber.

FIG. 5 illustrates an alternate embodiment of the invention, this figure illustrating a coupler 51 which has a slot 52 formed between first and second members 53, 54, an inner face 55 of the slot 52 having a curved profile similar to that of the groove 17 and bend profile 2b shown in FIG. 1A. According to this embodiment, the fiber 31 can be traversely slid along a direction of arrow 56 into the slot, and a slider member 50 can be urged within the slot 52 so as to securely bend the fiber 31. The slider 50 has an end face profile 57 complementary to that of the inner face 55 of the slot 52.

Figure 3:
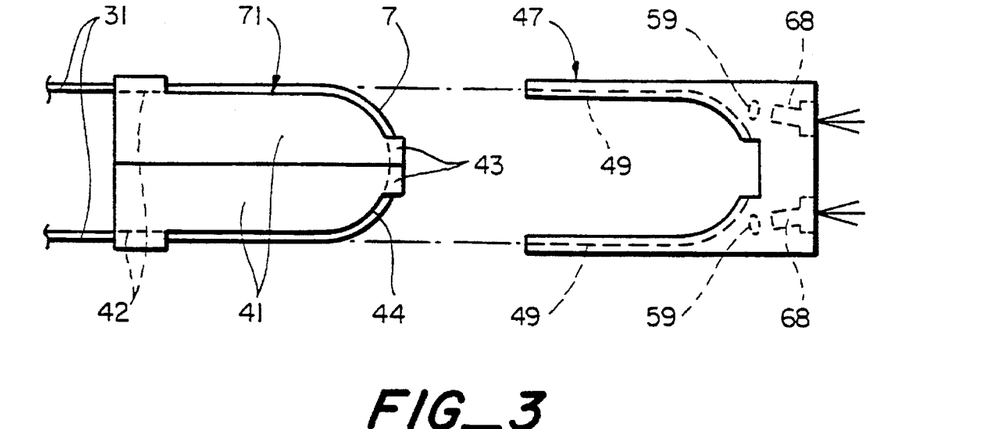
FIG. 3 illustrates another preferred package whereby coupling is achieved with optical fibers through a side thereof.
Figure 4:
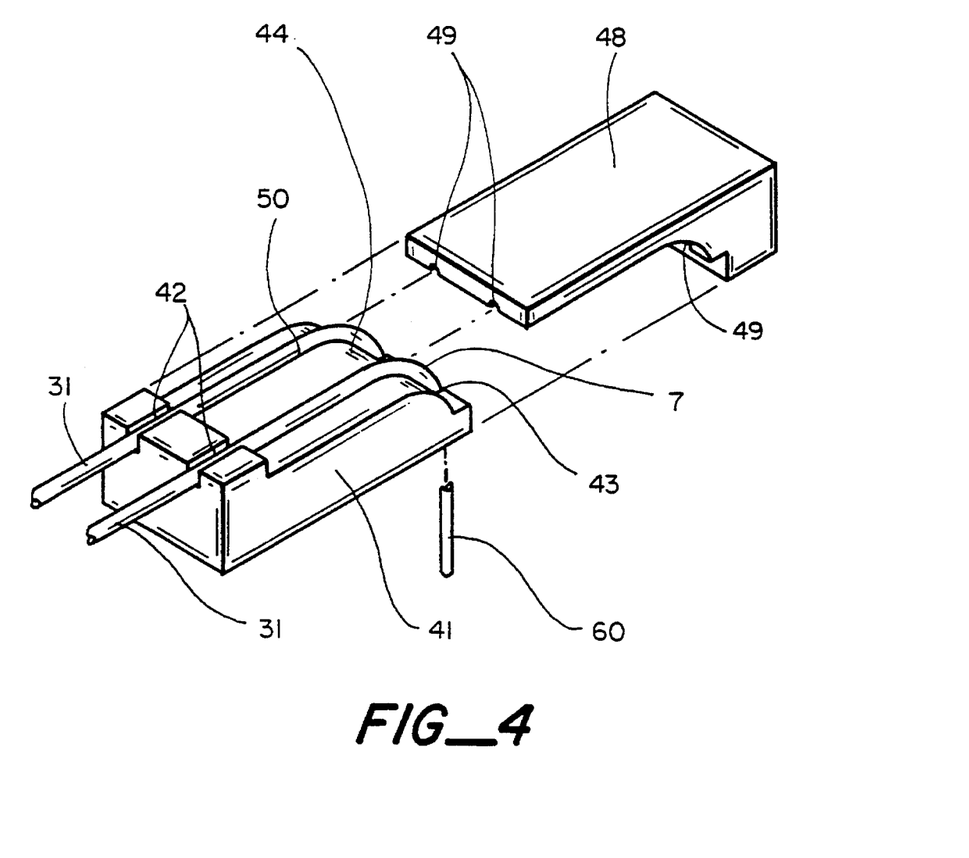
FIG. 4 illustrates an alternate coupler package.

FIGS. 3 and 4 illustrate yet further embodiments of the invention. Referring to FIG. 3, shown in plan view is an apparatus capable of bending an optical fiber about a total sector angle arc of 180° so as to allow optical coupling between a core thereof and an electro-optical transducer at first and second locations located on approximate opposite sides of the arc to allow for convenient reading and writing without needing access to an end of the fiber. However, the coupler and package embodiments disclosed can also be used on fiber where its end is not in close proximity to the bend created by the coupler.

The embodiment of FIG. 4 is similar to that of FIG. 3 except that the apparatus of FIG. 4 bends the fiber only about a sector angle of about 90°. As FIG. 4 clearly illustrates, a number of optical fibers 31 can be contained on bending member 41, and the bending member 71 of FIG. 3 can be formed simply by placing back-to-back first and second bending members 41, as illustrated. According to these embodiments, the member 41 includes a channel 42 having a width slightly smaller than that of an outer coating of the fiber 31 so that an intermediate section of the fiber can be laterally inserted into the channel 42 and held securely thereto by frictional forces. Further complementary channels 43 are provided by a bending portion 44 of the member 41, these lateral channels 43 also having a width slightly smaller than an outer coating of the optical fiber 31 so that the fiber 31 can laterally be urged into the channel 43 and secured thereby by frictionally forces. Since the fibers 31 are held at first and second points in the channels 42, 43, by urging the male member 41 into a mating female member 47, 48, the fiber 31, being securely clamped in grooves 49, 50, is able to be maintained in a stable bent attitude so that optical coupling between the transducers 68 and optic fiber core at a bend 7 in the fiber is easily achievable.

According to the invention, the transducer 68 can comprise either light emitters, e.g. an LED or a laser, and alternatively a light detector, e.g. a photodetector, and optionally lenses 59 can be provided for providing optimal focusing.

An advantageous feature of FIG. 4 is that an optical fiber can be conveniently terminated near its end so as to not require cleaving or polishing of the fiber end. In particular, after the fiber 31 is secured in the grooves 42, 43, an excess length 60 thereof extending beyond the channel 43 can be simply broken off so as to allow the male member 41 to be conveniently urged into the female member 48, both of which can be securely contained within an outer housing (not shown).

Figure 6:
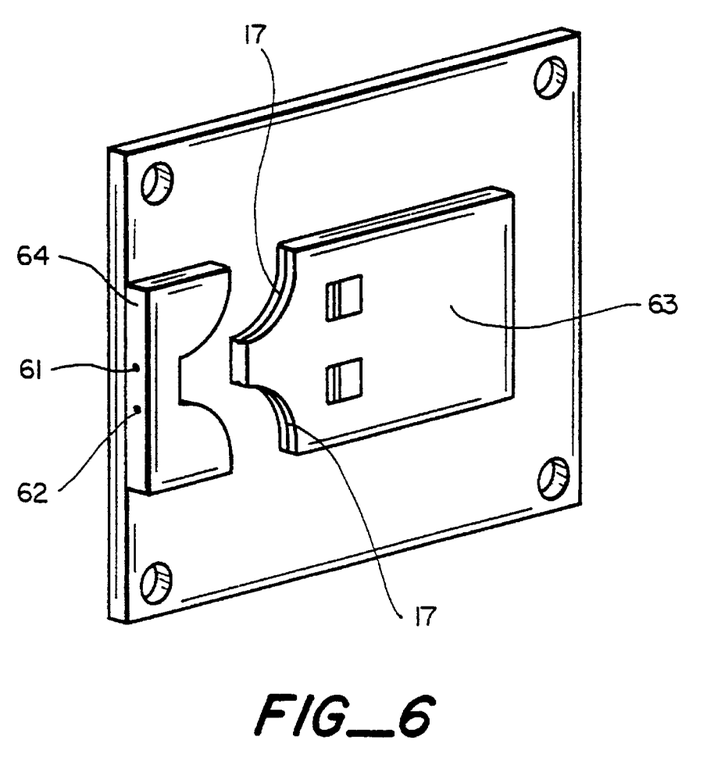
FIG. 6 illustrates yet a further coupler design.

FIG. 6 shows a further feature of the invention whereby first and second optical fiber ends are insertable into first and second holes 61, 62 so as to lie adjacent first and second optical fiber channels 17 on a member 63. Thereafter, the member 63 is slid so as to contact member 64 and securely contain-the optical fibers in a bent attitude. A length of the optical fiber adjacent but outside the channel 17 of the member 63 away from the holes 61, 62 can then be broken off if desired, thereby achieving a convenient method of terminating an end of an optical fiber but not requiring that the end be cleaved or polished.

Figure 7:
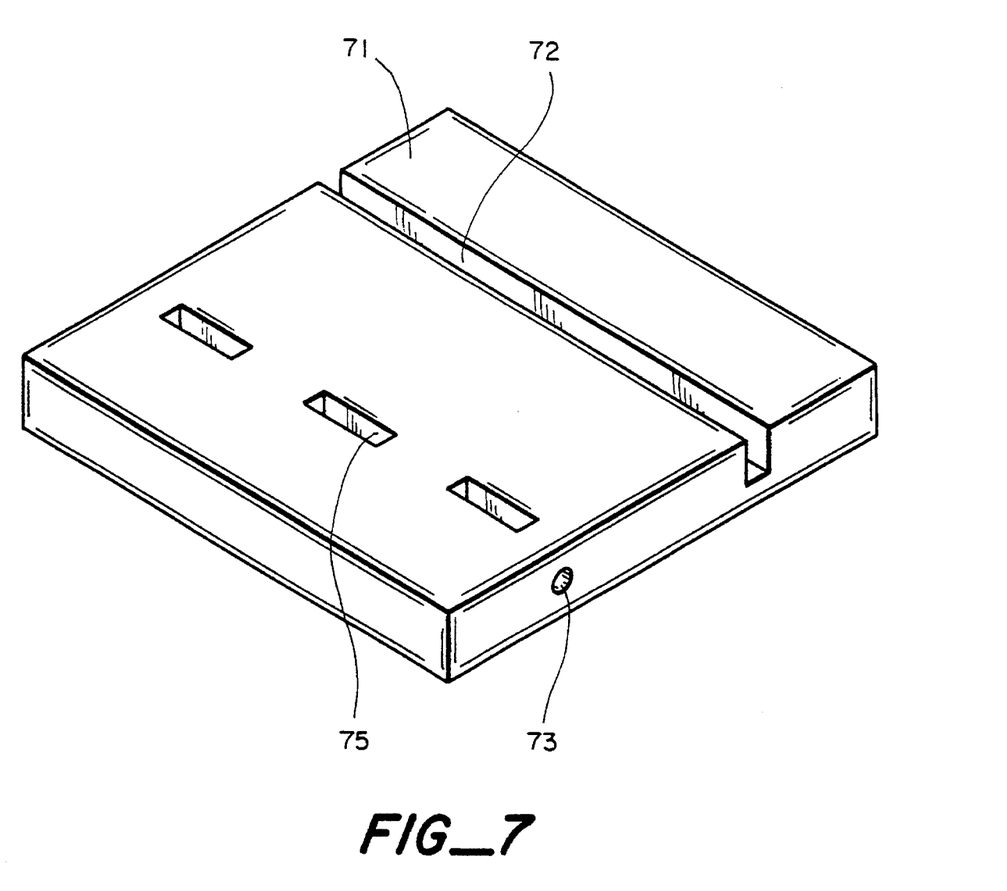
FIGS. 7 and 8 illustrate a high density interconnector or printed circuit board substrate whereby cross connect communication lines can be conveniently routed using couplers and packages according to the present invention.
Figure 8:
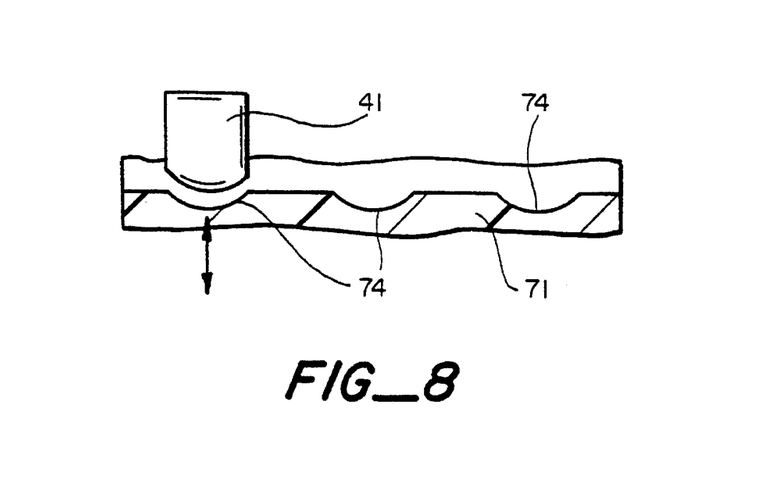

FIGS. 7 and 8 illustrate further advantageous features of the invention, FIG. 7 illustrating a printed circuit board 71 having a channel 72 therein and/or alternatively a hole 73 through an interior section thereof. According to this embodiment of the invention, a bottom portion of the channel 72 and the hole 73 has a plurality of discrete and separated bend profile regions 74 along a length thereof. Accordingly, if an end of an optical fiber is captivated in a member 41 such as that illustrated in FIG. 4, the member 41 can then be inserted into slots 75 extending from a top printed circuit board down to the hole 73 so as to accurately position an end portion of the optical fiber held by the member 41 against the bend profile 74. By disposing appropriate electrooptic elements within the printed circuit board adjacent the bend profile 74, electro-optic elements comprising other waveguides or electro-optic transducers or waveguides connected to electro-optic transducers or simply electro-optic transducers, this embodiment of the invention allows a signal to be removably picked up from the printed circuit board at any one of a variety of locations. Accordingly, a convenient patch panel can be assembled utilizing this approach.

Though the invention has been described by reference to certain preferred embodiments thereof, it is not to be limited thereby and only by the appended claims.

What is claimed is:

1. An optical fiber transmission network for transmitting at least one of encoded data, voice, and video signals at a modulation rate in excess of 1 mHz between first and second telecommunication units, comprising:

first and second telecommunications units;

a first optical fiber having first and second ends for transmitting at least one of encoded data, voice, and video signals at a modulation rate in excess of 1 mHz between the units;

means for modulating light from a light source so as to encode information indicative of the data, voice, or video signals at a modulation rate in excess of 1 mHz to be transmitted from the first telecommunication unit to the second telecommunication unit;

means for injecting the modulated light into the first optical fiber so as to propagate away from its first end and towards its second end;

means for withdrawing and detecting the modulated light through a side of the fiber at a first bend at a location in close proximity to the second fiber end; and means for recreating the data, voice, or video signals from the detected modulated light for use by the second telecommunications unit.

2. The network of claim 1, further comprising means for terminating the second fiber end so as to minimize light back reflections thereat.

3. The network of claim 1, the injecting means injecting the modulated light into the first optical fiber through its first end.

4. The network of claim 1, the injecting means injecting the modulated light into the first optical fiber through a side of the fiber at a second bend at a location in close proximity to the first fiber end.

5. The network of claim 4, further comprising:

a second optical fiber interconnecting the first and second telecommunication units for transmitting at least one of further encoded data, voice, and video signals at a modulation rate in excess of 1 mHz from the second unit to the first unit, the second fiber having first and second ends located in close proximity to the first and second ends of the first fiber, respectively;

second means for modulating light from a second light source so as to encode further information indicative of further data, voice, or video signals at a modulation rate in excess of 1 mHz and injecting the further modulated light into the second fiber at a third bend at a location in close proximity to its second end so as to propagate towards its first end;

second means for withdrawing the further modulated light at a fourth bend at a location in close proximity to the second fiber first end;

second means for recreating the further information from the detected further modulated light for use by the first telecommunication unit.

6. The network of claim 4, further comprising means for terminating the second fiber end so as to minimize light back reflections thereat.

7. The network of claim 4, the first bend being within 10 cm of the second fiber end and the second bend being located within 10 cm of the first fiber end.

8. The network of claim 1, the first bend being within 10 cm of the second fiber end.

9. The network of claim 1, further comprising:

a second optical fiber interconnecting the first and second telecommunication units for transmitting at least one of further encoded data, voice, and video at a modulation rate in excess of 1 mHz signals from the second unit to the first unit, the second fiber having first and second ends located in close proximity to the first and second ends of the first fiber, respectively;

second means for modulating light from a second light source so as to encode further information indicative of further data, voice, or video at a modulation rate in excess of 1 mHz signals and injecting the further modulated light into the second fiber at a second bend at a location in close proximity to its second end so as to propagate towards its first end;

second means for withdrawing the further modulated light through the first end of the second fiber;

second means for recreating the further information from the detected further modulated light for use by the first telecommunication unit.

10. The network of claim 1, further comprising:

a second optical fiber interconnecting the first and second telecommunication units for transmitting at least one of further encoded data, voice, and video at a modulation rate in excess of 1 mHz signals from the second unit to the first unit, the second fiber having first and second ends located in close proximity to the first and second ends of the first fiber, respectively;

second means for modulating light from a second light source so as to encode further information indicative of further data, voice, or video signals at a modulation rate in excess of 1 mHz and injecting the further modulated light into the second fiber second end so as to propagate towards its first end;

second means for withdrawing the further modulated light at a second bend at a location in close proximity to the second fiber first end;

second means for recreating the further information from the detected further modulated light for use by the first telecommunication unit.

11. An optical fiber transmission network for transmitting at least one of encoded data, voice, and video signals at a modulation rate in excess of 1 mHz between first and second telecommunication units, comprising:

first and second telecommunication units;

a first optical fiber having first and second ends for transmitting at least one of encoded data, voice, and video signals at a modulation rate in excess of 1 mHz between the units;

means for modulating light from a light source so as to encode information indicative of the data, voice, or video signals at a modulation rate in excess of 1 mHz to be transmitted from the first telecommunication unit to the second telecommunication unit;

means for injecting the modulated light into the first optical fiber through a side of the fiber at a first bend at a location in close proximity to the first fiber end so as to propagate towards the second fiber end;

means for withdrawing and detecting the modulated light at a location in close proximity to the second fiber end; and means for recreating the data, voice, or video information from the detected modulated light for use by the second telecommunication unit.

12. The network of claim 11, the withdrawing and detecting means withdrawing the modulated light from the second optical fiber end.

13. The network of claim 11, the first bend being located within 10 cm of the first optical fiber end.

14. The network of claim 11, further comprising:

a second optical fiber interconnecting the first and second telecommunication units for transmitting at least one of further encoded data, voice, and video signals at a modulation rate in excess of 1 mHz from the second unit to the first unit, the second fiber having first and second ends located in close proximity to the first and second ends of the first fiber, respectively;

second means for modulating light from a second light source so as to encode further information indicative of further data, voice, or video signals at a modulation rate in excess of 1 mHz and injecting the further modulated light into the second fiber second end at a location in close proximity to its second end so as to propagate towards its first end;

second means for withdrawing the further modulated light at a second bend through the second fiber first end;

second means for recreating the further information from the detected further modulated light for use by the first telecommunication unit.

15. The network of claim 11, further comprising:

a second optical fiber interconnecting the first and second telecommunication units for transmitting at least one of further encoded data, voice, and video signals at a modulation rate in excess of 1 mHz from the second unit to the first unit, the second fiber having first and second ends located in close proximity to the first and second ends of the first fiber, respectively;

second means for modulating light from a second light source so as to encode further information indicative of further data, voice, or video signals at a modulation rate in excess of 1 mHz and injecting the further modulated light into the second fiber at a second bend at a location in close proximity to the second end so as to propagate towards its first end;

second means for withdrawing the further modulated light through the first end of the second fiber first end;

second means for recreating the further information from the detected further modulated light for use by the first telecommunication unit.

16. An optical fiber transmission network for transmitting at least one of encoded data, voice, and video signals at a modulation rate in excess of 1 mHz between first and second telecommunication units, comprising:

first and second telecommunications units;

a first optical fiber having first and second ends for transmitting at least one of encoded data, voice, and video signals at a modulation rate in excess of 1 mHz between the units;

means for modulating light from a light source so as to encode information indicative of the data, voice, or video signals at a modulation rate in excess of 1 mHz to be transmitted from the first telecommunication unit to the second telecommunication unit;

means for injecting the modulated light into the first optical fiber end;

means for withdrawing and detecting the modulated light from the second fiber end;

means for recreating the data, voice, or video signals from the detected modulated light for use by the second telecommunications unit;

means for injecting a second light signal into the optical fiber at a bend located in close proximity to the second fiber end so as to propagate towards the first fiber end;

means for withdrawing the second light signal from the optical fiber at a second bend located in close proximity to the first fiber end, the second signal transmitting at least one of encoded data, voice and video signals at a modulation rate in excess of 100 Hz.

17. The network of claim 16, the modulation rate of the second signal being between 1 kHz and 1 mHz.

18. An apparatus for coupling light representative of at least one of encoded data, voice, and video signals between first and second optical fibers and first and second electro-optic transducers, respectively, comprising:

first and second optical fibers;

first and second electro-optic transducers;

first and second means for bending the first and second optical fibers, respectively, so that light can be coupled between the first transducer and first fiber and between the second transducer and the second fiber at the first and second bends, respectively, the first and second bends being located in close proximity to a first end of the first and second fibers, respectively;

the first transducer sending at least one of encoded data, voice, and video signals to a first telecommunications unit connected to the first and second fibers in a vicinity of their second opposite ends, the second transducer receiving at least one of data, voice, and video light signals from the first telecommunications unit.

19. The apparatus of claim 18, the first and second bending means being arranged in a stacked orientation such that a plane of a bend of the first fiber is parallel to and adjacent with a plane of a bend of the second fiber, the first and second electro-optic transducers having light coupling areas oriented to either emit or receive light along a direction substantially perpendicular to the planes of the first and second fibers.

20. The apparatus of claim 18, the first and second bending means comprising a substrate having a curved plane on a side thereof with first and second fiber engagement areas at opposite ends of the curved plane, the engagement areas being sized so as to frictionally retain the first and second fibers thereat.

* * * * *

UNITED STATES PATENT AND TRADEMARK OFFICE

CERTIFICATE OF CORRECTION

PATENT NO. : 5,475,779

INVENTOR(S) : UKEN et al

DATED : December 12, 1995

It is certified that error appears in the above-identified patent and that said Letters Patent is hereby corrected as shown below:

Column 1, Line 54, replace "3 mHz" by --3 MHz--.
    Column 1, Line 54, replace "10 mHz" by --10 MHz--.
    Column 1, Line 56, replace ".25 mHz" by --.25 MHz--.
    Column 1, Line 56, replace "1.0 mHz" by --1.0 MHz--.
    Column 1, Line 57, replace "2.0 mHz" by --2.0 MHz--.
    Column 1, Line 17, replace "5.0 mHz" by --5.0 MHz--.
    Column 1, Line 58, replace "10.0 mHz" by --10.0 MHz--.
    Column 1, Line 58, replace "20.0 mHz" by --20.0 MHz--.
    Column 1, Line 59, replace "40.0 mHz" by --40.0 MHz--.
    Column 1, Line 59, replace "60.0 mHz" by --60.0 MHz--.
    Column 1, Line 59, replace "100 mHz" by --100 MHz--.
    Column 4, Line 24, replace "light is emitting" by --light emitting--.

UNITED STATES PATENT AND TRADEMARK OFFICE

CERTIFICATE OF CORRECTION

PATENT NO.    : 5,475,779

INVENTOR(S)   : UKEN et al

DATED         : December 12, 1995

It is certified that error appears in the above-identified patent and that said Letters Patent is hereby corrected as shown below:

Column 4, Line 34, replace "the s disclosure" by --the disclosure--.
Column 5, Line 23, replace "1 mHz" by --1 MHz--.
Column 5, Line 28, replace "0.5 mHz" by --0.5 MHz--.
Column 5, Line 29 replace "2 mHz" by --2 MHz--.
Column 7, Line 63, replace "1 mHz" by --1 MHz--.
Column 8, Line 1, replace "1 mHz" by --1 MHz--.
Column 8, Line 5, replace "1 mHz" by --1 MHz--.
Column 8, Line 32, replace "1 mHz" by --1 MHz--.
Column 8, Line 39, replace "1 mHz" by --1 MHz--.
Column 8, Line 62, replace "1 mHz" by --1 MHz--.
Column 9, Line 2, replace "1 mHz" by --1 MHz--.
Column 9, Line 15, replace "1 mHz" by --1 MHz--.
Column 9, Line 22 replace "1mHz" by --1 MHz--.

UNITED STATES PATENT AND TRADEMARK OFFICE
CERTIFICATE OF CORRECTION

PATENT NO.    : 5,475,779

INVENTOR(S)   : UKEN et al

DATED         : December 12, 1995

It is certified that error appears in the above-identified patent and that said Letters Patent is hereby corrected as shown below:

Column 9, Line 33, replace "1 mHz" by --1 MHz--.
Column 9, Line 39, replace "1 mHz" by --1 MHz--.
Column 9, Line 43, replace "1 mHz" by --1 MHz--.
Column 9, Line 66, replace "1 mHz" by --1 MHz--.
Column 10, Line 6, replace "1 mHz" by --1 MHz--.
Column 10, Line 19, replace "1 mHz" by --1 MHz--.
Column 10, Line 26, replace "1 mHz" by --1 MHz--.
Column 10, Line 38, replace "1 mHz" by --1 MHz--.
Column 10, Line 44, replace "1 mHz" by --1 MHz--.
Column 10, Line 48, replace "1 mHz" by --1 MHz--.
Column 11, Line 1, replace "1 mHz" by --1 MHz--.

Signed and Sealed this

Fourth Day of June, 1996

*Attest:*

BRUCE LEHMAN

*Attesting Officer*    *Commissioner of Patents and Trademarks*